Jan. 30, 1934.  C. W. MARSH  1,945,152
PISTON
Original Filed June 1, 1931
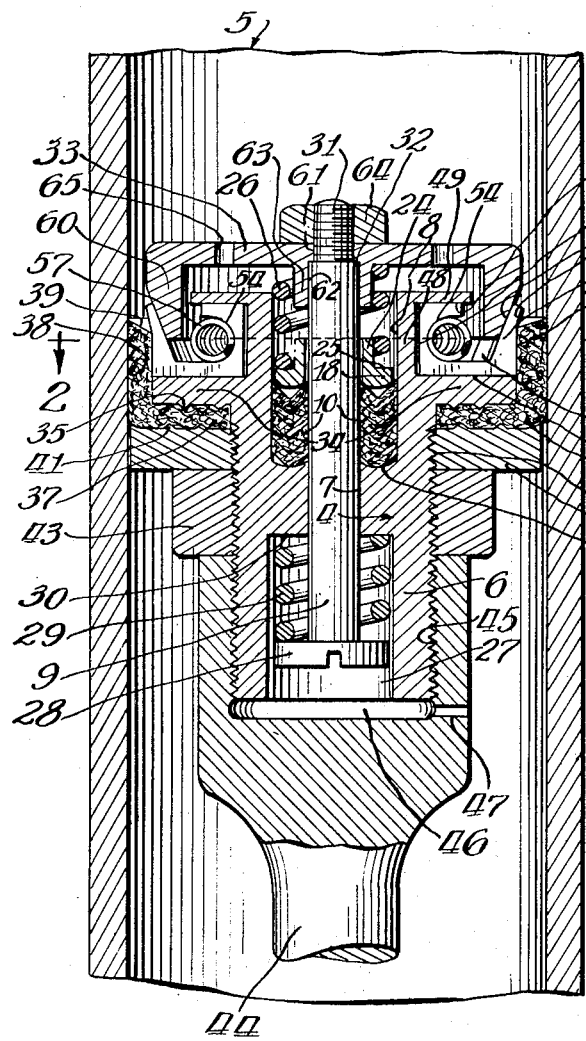
Inventor:
Charles W. Marsh
By Williams, Bradbury,
McCaleb & Hinkle
Attys.

UNITED STATES PATENT OFFICE 1,945,152

PISTON

Charles W. Marsh, Muskegon, Mich.

Original application June 1, 1931, Serial No. 541,301. Divided and this application June 6, 1932. Serial No. 615,634

7 Claims. (Cl. 309—34)

The present invention relates to pistons, and is particularly concerned with pistons of the type adapted to be employed in a cylinder for use in pumps, air compressors, hydraulic rams, air hoists, air chucks, railway air brakes, automobile brakes, door checks and myriad other uses.

One of the objects of the invention is the provision of an improved cylinder and piston arrangement in which the piston is adapted to run idle without excessive tension or wear on the packing devices employed with the piston.

Another object is the provision of an improved piston in which the expansion of the packing devices is controlled and regulated by the amount of fluid pressure acting upon the piston, so that compensation is made for the increased tendency to leak past the packings under high pressure.

Another object is the provision of a piston of the class described, in which all of the moving parts are suitably arranged to prevent leakage of any kind past the pistons under low pressures or high pressures, and which is adapted to maintain a constant pressure without substantial leakage, for long periods of time.

Another object is the provision of a piston of the class described, which is adapted to prevent the building up of a pressure behind the packings, such as might tend to offset the compensating action of the high fluid pressure in the cylinder.

Another object is the provision of an improved piston of the class described, which is capable of long and continuous service without necessity for repacking.

Another object is the provision of a high pressure packing which is particularly adapted to be used in hydraulic machinery under extremely high pressures, and which will operate efficiently under such pressures for an extremely long life.

The present application is a division of my parent application, Serial No. 541,301, filed June 1, 1931, on pistons, and relates particularly to one of the embodiments disclosed in Figs. 6 and 7 of said parent application.

Other objects and advantages of the invention will be apparent from the following description and from the accompanying drawing, in which similar characters of reference indicate similar parts throughout the several views.

Referring to the single sheet of drawing,

Fig. 1 is a sectional view of a cylinder and a piston constructed according to the present invention, the section being taken on a line passing through the axis of the cylinder and piston;

Fig. 2 is a sectional view taken on the plane of the line 2—2 of Fig. 1;

Fig. 3 is a diagrammatic cross sectional view taken through one of the packings, the supporting packing seat and the expander employed in the present piston, showing the expanding action which takes place in the packing.

Referring to Figs. 1 and 2, the piston is indicated in its entirety by the numeral 4 and the cylinder by the numeral 5.

The piston 4 preferably includes a supporting body 6, which is provided with a bore 7 and a counterbore 8. A plunger rod 9 is slidably mounted in the bore 7 and is provided with a multiplicity of packings 10 in the counterbore 8 for preventing leakage about the rod 9. The packings preferably consist of closed rings or molded leather members having a substantially V-shaped cross section, as shown in Fig. 3.

While the closed leather rings are preferred for the reason that there is less possibility of leakage than where a split ring is employed, split rings formed of strips of the same material of V-shaped cross section, with the ends of the strip in abutting relation, may also be utilized where a plurality of packings are employed, and in such case the joints in the respective rings are preferably staggered with respect to each other.

The packing rings, indicated by the numeral 10, may also be arranged in the form of a helix, of which the separate turns constitute the various rings, but in such case the expanders and seat should be formed of a shape complementary to the ends of a helix of packing of this type, in order that the expander and seat may come into engagement with the packing about the full periphery of the piston.

The packing rings 10 are preferably provided with a pair of frusto-conical flanges 11 and 12 joined together at the apex 13 along the line of a circle, forming packing of substantially V shape.

A helical strip of V-shaped packing may also be employed with an expander and seat of the type illustrated, provided the ends of the helix are beveled off very gradually to a sharp point so that there is no offset at the end of the helix.

The edges 14 and 15 of the packing are preferably beveled to form substantially sharp edges or lips 16, 17, the edges 14 and 15 being substantially cylindrical in shape and concentric with each other. When a number of turns or rings of V-shaped packing are employed, the packings are nested in each other, as shown in Fig. 1, the inside of each lower packing engaging the outside of the next adjacent packing. Each ring of packing is thus supported by the adjacent rings of packing, and all of the rings are expanded together at the same time.

The packings are preferably actuated by a pair of members 18 and 19 act as the expander and packing seat, respectively, located above and below the packings, which is adapted to fit about the plunger and which is provided with a concave surface 20 for engaging the apex 13 of the packing.

The concave annular groove 20 is of less depth than the altitude of the V-shaped section of the ring, so that the member 19 initially engages the apex 13 of the packing and through the inter-engagement of the successive layers of packing is adapted to force the apices of all of the packing rings together, or to support the apices in predetermined position as the flanges are forced downward.

The expansion member 18 is preferably provided with a convex packing engaging surface 21, which is of less height than the altitude of the V-shaped section of one of the packing rings, so that the convex surface of the metal expansion ring initially engages the lower inside edges 22, 23 of the adjacent packing ring.

Through the inter-engagement of the packing ring 10 with the other packing rings, the expansion member 18 is adapted to force outward all of the outer edges of the packing rings which are nested together.

Referring to Fig. 3, this is a diagrammatic illustration of the expanding action of the members 18 and 19 on the packing rings, and, while a single packing ring is illustrated in Fig. 3 for the purpose of clarity, the action is the same when a plurality of packing rings are employed, and the packing rings are nested together, as shown in Fig. 1.

The full-line illustration of the packing 10 shows the ring and the expansion member before pressure is applied to the members 18, 19. As soon as pressure is applied to effect a relative movement of the members, such as the movement of the upper expansion ring in the direction of the arrow, the apex 13 is forced toward the sharp edges 16 and 17. Since the width of the flanges 11, 12 is greater than the space between the opposite edges 14 and 15, the packing is expanded edgewise to the position shown in the dotted lines in Fig. 3.

The concavely curved surface 20 of the ring 19 and the convexly curved surface 21 of the expansion ring 18 are preferably such that when the packing is fully expanded the rings engage and reinforce the V-shaped leather packing to hold it in predetermined position and prevent the packing from any bending action under the influence of the frictional engagement between the packing and the wall of the piston. The rings are thus prevented from slithering back and forth where the packing is employed in a reciprocating member, but are adapted to take up the wear and maintain a fluid-tight joint at all times.

The packing is preferably arranged so that the pressure is greater on the inside of the V-shaped packing than on the outside, that is, at the top of Fig. 3 the greater pressure is applied so that the fluid pressure tends to force the sharp edges 16, 17 into closer engagement with the walls of the cylinder.

Referring again to Figs. 1 and 2, the annular shoulder 20 at the base of the counterbore 8 is provided with a concavely curved annular surface, just described, and forms the seat for engaging the apex of the packings. The upper expander comprises an annular metal member 18, which is preferably provided with an axially extending tubular flange 24 and formed with an annular seat 25 for the helical compression spring 26.

The piston body 6 is also provided with a counterbore 27 at its opposite end for receiving the head 28 of the bolt 9, and a helical compression spring 29 is compressed between the head 28 and the annular shoulder 30 at the base of the counterbore 27.

The plunger rod 9 is preferably provided with a threaded end 31 of reduced size, forming an annular shoulder 32, and the upper end of rod 9 supports a camming or expanding member 33. The piston body 6 is preferably provided with a radially extending flange 34, having a substantially flat upper surface, and the lower surface of the flange 34 may be provided with a plurality of annular ridges 35 for gripping the packing and improving the non-leaking securement of the packing to the piston.

The diameter of the annular flange 34 is such that it will fit within a cup-shaped leather packing 36, which is provided with an inwardly extending radial flange 37 and a cylindrical flange 38. The cylindrical flange 38 is preferably beveled to a sharp edge at 39 so that the fluid pressure in the cylinder may act upon the relatively sharp and flexible edge and force it into closer engagement with the wall of the piston.

The packing 36 may be secured in place by a pressure plate 40, consisting of an annular metal member, which is also preferably provided with annular ridges 41 on its upper side for engaging the radially extending flange 37. The pressure plate 40 is provided with a threaded bore 42 adapted to engage the threads on the piston body 6, or the pressure plate 40 may in some cases be provided with a cylindrical bore and secured in place by means of the nut 43 and the piston rod 44.

The piston rod 44 is provided with a threaded bore 45 at its end for receiving the threaded end of the body 6, thereby forming a chamber 46, and the chamber 46 is preferably provided with a bleeder conduit 47 communicating with the atmosphere or the low pressure side of the cylinder so as to relieve any pressure in the chamber 46. The upper end of the piston body 6 is provided with a tubular part 48 terminating in a radially extending annular flange 49.

A plurality of expanding segments 50 are slidably mounted between the flange 49 and the flange 34 for sliding movement in a radial direction. Each of the segments 50 comprises a metal member having a flat lower surface 51 and having a flat upper surface 52. The inner surface 53 may be cylindrical, and the expanding segment is preferably provided with a groove 54 of circular cross section, which extends concentrically to the cylindrical surface 53. At its outer edge the expander segment is provided with a cylindrical outer surface 54' carried by an upwardly extending curved flange 55. The extreme upper end of the flange 55 may curve outward as at 56, and the cylindrical surface 54' of the expanding segment engages the inside of the cylindrical flange 38 of the cup-shaped packing.

A helical garter spring 57 is arranged in the circular groove 54, and tends to draw all of the segments 50 in toward the tubular body 48, and the segments are preferably of such size that they will fit in place about the tubular part 48 without effecting any expanding action on the cup-shaped packing 36 in that position.

Each of the segments is also preferably provided with a substantially frusto-conical inner camming surface 58 on the flanges 55 for engagement with a complementary external frusto-conical surface 59 on the expanding member 33.

The expanding member 33 comprises a circular metal member formed with a depending annular flange 60, the outer face of which is provided with a frusto-conical surface 59. The expander 33 is provided with a circular bore 61 for receiving the reduced threaded end 31 of the rod 9 and with a counterbore 62 for receiving the rod 9 itself.

The tubular extension 63 is adapted to maintain the alignment of the helical compression spring 26, which is seated against the lower side of the expander 33. The expander is secured on the rod 9 by means of the nut 64.

The expander is preferably provided with a plurality of apertures 65, permitting the access of fluid under pressure to the space inside the expander, inside the cup-shaped packing 36, and inside the packing 10.

The operation of the piston shown in Fig. 1 is as follows:

Both the springs 26 and 29 are under an initial compression, the spring 29 tending to draw the rod 9 downward in Fig. 1. Coil spring 26 is preferably of less strength than coil spring 29 so that coil spring 29 is capable of counteracting the force of both the coil spring 26 and the garter spring 57.

Coil spring 26 reacts against the expander 33 to place the V-shaped packings 10 under a predetermined initial pressure. This pressure is increased when the upper side of the piston in Fig. 1 is subjected to increased pressure by virtue of the thrust upon the plunger rod 9, which is produced by pressure in the upper end of the cylinder. Increased pressure in the cylinder thus results in an increase in the expanding action on the V-shaped packings which surround the plunger 9, and increased pressure in the cylinder is accompanied by an increased fluid tendency of the packings to prevent leaking, or a more effective sealing.

The garter spring 57 tends to draw the expanding segments 50 inward in a radial direction, but the expander 33 engages inside the segments and tends to cam them outward by means of the frusto-conical surfaces 58 and 59. The pressure of the spring 29 is preferably such that it places a slight initial expanding pressure on the cylindrical flange 38 by means of the segments 50. When the upper end of the cylinder is subjected to increased pressure, this pressure tends to drive the cylindrical flange 38 into closer engagement with the wall of the cylinder, and this pressure produces a thrust on the rod 9, which drives the expander 33 downwards. This cams the segments 50 out in a radial direction and increases the expanding action of the segment on the cylindrical flange 38 of the cup-shaped packing. At the same time, the downward movement of the rod 9 places an increased pressure on the coil spring 36 which acts upon the expander 18.

A slight degree of leakage may be expected under rigorous conditions of service, past the packings 10 about the rod 9 in the bore 7, and this leakage would tend to build up a pressure in the chamber 46, were it not for the fact that a bleeder conduit 47 has been provided to continually release the pressure in the chamber 46.

If this pressure were allowed to build up in the chamber 46, the packings would still be expanded by the spring 29, but there would be no differential of pressure between the two ends of the expander rod to compensate for the increased tendency toward leakage by means of the increased expanding action. The same result may also be achieved by the use of a piston rod 44, which does not confine the lower end of the rod 9.

In some embodiments of the invention, occasional V-shaped felt washers may be interposed between the V-shaped leather washers, the felt washers being impregnated with solid lubricant, which is squeezed out of the felt washers by increased pressure, and this tends to provide an increased flow of lubricant for severe service of the piston. Felt washers also permit the relatively sharp lips of the V-shaped packing to move more freely into engagement with the adjacent metal parts, and felt washers thus facilitate the expanding action of the V-shaped packing.

The springs may be proportioned to place only a light pressure upon the expanders and packings when the piston is idling, so that the piston may idle without excessive wear on the packing, but as soon as the piston begins to do work and pressure is increased on the working side of the piston, the expanders automatically compensate for the increased tendency toward leakage by increasing the pressure on the packings. A greater fluid pressure in the cylinder requires a greater sealing action of the packings, and the sealing action in a piston of the type described is proportioned to the pressure in the cylinder and sufficient to make the piston very effective under all pressures.

It will thus be observed that I have invented an improved piston in which the sealing action of the packings is increased by the pressure in the cylinder in which the piston is mounted. Increased pressure not only effects an expansion of the packings at the outer surface of the piston, but of the packings surrounding the resiliently mounted plunger, and the present pistons are capable of maintaining high pressures without leakage for long periods of time without any necessity for repacking the piston.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States, is:

1. A piston comprising a piston body, a cup-shaped leather packing having a radial flange clamped on said body and having a cylindrical flange engaging the wall of a cylinder, a plurality of segmental members engaging the inside of said latter flange, an expander mounted to expand said segmental members and having a plunger passing through said piston whereby increase of fluid pressure on said plunger increases the expanding action of said expander, a spring carried by said plunger for maintaining an initial pressure on said packing, said piston having a counterbore about said plunger, a plurality of V-shaped leather packings in said counterbore about said plunger, and a spring tensioned between said latter packings and said expander.

2. A piston comprising a piston body, a cup-shaped leather packing having a radial flange clamped on said body and having a cylindrical flange engaging the wall of a cylinder, a plurality of segmental members engaging the inside of said latter flange, an expander mounted to expand said segmental members and having a plunger passing through said piston whereby increase of fluid pressure on said plunger increases the expanding action of said expander, a spring carried by said plunger for maintaining an initial pressure on said packing, said piston having a counterbore about said plunger, a plurality of V-shaped leather packings in said counterbore about said plunger, and a spring tensioned between said latter packings and said expander, said latter spring being of less strength than the first-mentioned spring.

3. A piston comprising a body having a radially extending flange, a cup-shaped packing having a cylindrical flange and a radial flange, means for providing a non-leaking connection between said radial flange of said packing and said radial flange on said piston body, said piston having a second radially extending guide flange, a plurality of expanding segments slidably mounted between said flanges on said piston body and having cylindrical outer surfaces adapted to engage the cylindrical flange of said packing, and an expander having a camming surface for engaging said expanding segments to force said segments into expanding engagement with said cylindrical flange.

4. A piston comprising a body having a radially extending flange, a cup-shaped packing having a cylindrical flange and a radial flange, means for providing a non-leaking connection between said radial flange of said packing and said radial flange on said piston body, said piston having a second radially extending guide flange, a plurality of expanding segments slidably mounted between said flanges on said piston body and having cylindrical outer surfaces adapted to engage the cylindrical flange of said packing, an expander having a camming surface for engaging said expanding segments to force said segments into expanding engagement with said cylindrical flange, and resilient means for moving said expander axially of said piston to effect an expansion of said packing.

5. A piston comprising a body having a radially extending flange, a cup-shaped packing having a cylindrical flange and a radial flange, means for providing a non-leaking connection between said radial flange of said packing and said radial flange on said piston body, said piston having a second radially extending guide flange, a plurality of expanding segments slidably mounted between said flanges on said piston body and having cylindrical outer surfaces adapted to engage the cylindrical flange of said packing, an expander having a camming surface for engaging said expanding segments to force said segments into expanding engagement with said cylindrical flange, resilient means for moving said expander axially of said piston to effect an expansion of said packing, and resilient means for urging said expanding segments inwardly in a radial direction, said latter resilient means being adapted to exert a lesser force on said expanders than said first-mentioned resilient means.

6. In a piston, the combination of a supporting body with a packing carried by said body for engaging a cylinder wall, a plurality of radially movable expanding members slidably mounted on said piston body for engaging said packing and varying the packing pressure, a camming member for engaging said expanding members and camming said expanding members outward in a radial direction, a plunger for movably supporting said camming member, said plunger having an annular shoulder on the opposite side of said piston from said camming member, and a spring tensioned between said shoulder and said piston body for urging said camming member in a predetermined direction to act upon said expanding members, said piston having a counterbore surrounding said plunger and a plurality of V-shaped leather packings in said counterbore surrounding said plunger, said camming member being subjected to increased force by virtue of the differential in pressure on said plunger caused by increased pressure on the working side of said piston.

7. In a piston, the combination of a supporting body with a packing carried by said body for engaging a cylinder wall, a plurality of radially movable expanding members slidably mounted on said piston body for engaging said packing and regulating the packing pressure, a camming member for engaging said expanding members and camming said expanding members outward in a radial direction, a plunger for movably supporting said camming member, said plunger having an annular shoulder on the opposite side of said piston from said camming member, and a spring tensioned between said shoulder and said piston body for urging said camming member in a predetermined direction to act upon said expanding members, said piston having a counterbore surrounding said plunger and a plurality of V-shaped leather packings in said counterbore surrounding said plunger, said camming member being subjected to increased force by virtue of the differential in pressure on said plunger caused by increased pressure on the working side of said piston, said counterbore being formed with a concave surface adapted to engage the apex of said V-shaped packings, a convexly curved annular expansion member surrounding said plunger and engaging inside the flanges of the V-shaped packing at the other end of said V-shaped packing assembly, and a spring compressed between said latter expander and said camming member to place an initial pressure on said V-shaped packing.

CHARLES W. MARSH.